United States Patent
Hendrickson et al.

(10) Patent No.: US 10,788,622 B2
(45) Date of Patent: Sep. 29, 2020

(54) OPTICALLY CONDUCTIVE HYBRID CABLE

(71) Applicant: OFS Fitel, LLC, Norcross, GA (US)

(72) Inventors: Daniel Hendrickson, Roswell, GA (US); Valerie Anne Hill, Villa Rica, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/150,567

(22) Filed: Oct. 3, 2018

(65) Prior Publication Data
US 2020/0110218 A1    Apr. 9, 2020

(51) Int. Cl.
*G02B 6/42*      (2006.01)
*G02B 6/036*     (2006.01)
*H04B 10/80*     (2013.01)

(52) U.S. Cl.
CPC .......... *G02B 6/036* (2013.01); *G02B 6/4293* (2013.01); *H04B 10/808* (2013.01)

(58) Field of Classification Search
CPC .... G02B 6/036; G02B 6/4293; G02B 6/4434; H04B 10/808
USPC ........ 385/100, 101, 103, 105, 106, 112, 114
See application file for complete search history.

(56) References Cited

U.S. PATENT DOCUMENTS

| | | | | |
|---|---|---|---|---|
| 6,974,239 B2* | 12/2005 | Currie | ................ | E01F 15/0453 362/551 |
| 7,569,637 B2* | 8/2009 | Koning | ................ | B82Y 30/00 524/502 |
| 9,188,756 B2* | 11/2015 | Register, III | ......... | G02B 6/4416 |
| 9,557,505 B2* | 1/2017 | Huegerich | ........... | G02B 6/4448 |
| 2005/0013573 A1* | 1/2005 | Lochkovic | ........... | G02B 6/4402 385/128 |
| 2005/0185903 A1* | 8/2005 | Koertel | ................ | G02B 6/4439 385/101 |
| 2009/0097805 A1* | 4/2009 | Bayindir | .................. | G02B 6/02 385/101 |
| 2009/0120689 A1* | 5/2009 | Zaeper | .................... | E21B 47/18 175/40 |

(Continued)

FOREIGN PATENT DOCUMENTS

CN    204463854    *    7/2015    ............... H01B 7/00

OTHER PUBLICATIONS

"The improvement on the properties of silver-containing conductive adhesives by the addition of Carbon Nanotube" by Lin et al, Proceeding of HDP'04, pp. 382-384, 2004.*

(Continued)

*Primary Examiner* — Robert Tavlykaev
(74) *Attorney, Agent, or Firm* — John Harman, Esq.

(57) ABSTRACT

Embodiments of the invention include a hybrid or electro-optical cable. The cable includes an optical fiber having a core region and a cladding region formed around the core region, and at least one coating region formed around the optical fiber cladding region. The coating region includes at least one first electrically conductive carbon structure, at least one second electrically conductive carbon structure, and an electrically insulating material coupled between the first electrically conductive carbon structure and the second electrically conductive carbon structure. The cable provides optical energy transmission via the optical fiber. The cable also provides electrical energy transmission via the at least one first and second electrically conductive carbon structures.

19 Claims, 5 Drawing Sheets

(56) References Cited

U.S. PATENT DOCUMENTS

| | | | | |
|---|---|---|---|---|
| 2010/0069559 A1* | 3/2010 | Koning | ................ | B82Y 30/00 |
| | | | | 524/496 |
| 2011/0150488 A1* | 6/2011 | Kewitsch | ............ | G02B 6/3895 |
| | | | | 398/116 |
| 2013/0122296 A1* | 5/2013 | Rose | ...................... | E21B 23/14 |
| | | | | 428/376 |
| 2015/0041730 A1* | 2/2015 | Kangas | ................ | C01B 32/174 |
| | | | | 252/511 |
| 2015/0184469 A1* | 7/2015 | Sherman | ............. | E21B 17/206 |
| | | | | 385/101 |
| 2016/0133355 A1* | 5/2016 | Glew | .................... | H01B 7/295 |
| | | | | 248/49 |

OTHER PUBLICATIONS

"Electrical and Mechanical Characterization of Carbon Nanotube Filled Conductive Adhesive" by Li et al, IEEEAC paper #1519, pp. 1-6, 2005.*

* cited by examiner

OPTICALLY CONDUCTIVE HYBRID CABLE

BACKGROUND OF THE INVENTION

Field of Invention

The invention relates to optical fiber cables. More particularly, the invention relates to hybrid optical fiber cables.

Description of Related Art

Conventional optical cables are used in many applications in which electrical power is required at the end points or termination points of the optical cable. These end points range from small wireless nodes to remote camera sets that need both high bandwidth provided by optical transmission and electrical power normally fed by copper conductors. The requirements of these end points often mandate a need for cables having both optical fiber elements and copper elements combined within a single structure. Such cables typically are referred to as hybrid cables or electro-optical cables.

There are many problems associated with conventional hybrid cables. Such problems include the relatively high cost of the copper leads within conventional hybrid cables, and restrictions in conventional hybrid cable constructions due to the copper leads impacting the optical fiber leads. Also, there often are limitations in the flexibility of conventional hybrid cable structures due to the copper leads.

SUMMARY OF THE INVENTION

The invention is embodied in a hybrid or electro-optical cable. The cable includes an optical fiber having a core region and a cladding region formed around the core region, and at least one coating region formed around the optical fiber cladding region. The coating region includes at least one first electrically conductive carbon structure, at least one second electrically conductive carbon structure, and an electrically insulating material coupled between the first electrically conductive carbon structure and the second electrically conductive carbon structure. The cable provides optical energy transmission via the optical fiber. The cable also provides electrical energy transmission via the at least one first and second electrically conductive carbon structures.

DETAILED DESCRIPTION OF EXEMPLARY EMBODIMENTS

Figure 1:
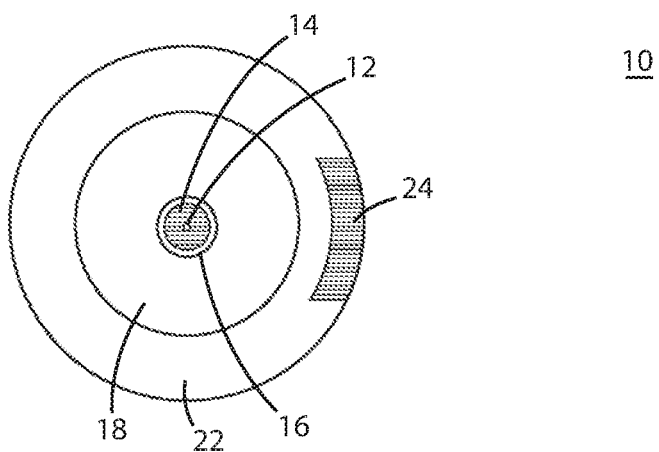
FIG. 1 is a cross-sectional view of a hybrid cable, according to an embodiment of the invention.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

The advent of conductive carbon structures (CCS) provides a unique path to address many of the underlying issues associated within conventional hybrid or electro-optical cables. Conductive carbon structures include a class of materials that include one or more axes of anisotropy, or directional dependency, which allows an electric path to form through the structure. Conductive carbon structures can take the form of as single wall carbon nanotubes, double wall nanotubes, multiwall nanotubes, porous nanotubes and doped nanotubes. Conductive carbon structures have many favorable properties, such as relatively high conductivity, relatively high temperature resistance, low weight, high strength and flexibility. Single wall carbon nanotubes and other conductive carbon structures can be made of or include the semi-metal graphene or carbon black.

Conventionally, conductive carbon structures are used to add relatively lightweight strength or thermal properties to many commercial and consumer products. Conventionally, conductive carbon structures also have been used in optoelectronic devices, such as photodetectors and solar cells.

According to embodiments of the invention, conductive carbon structures and CCS technologies are integrated into optical fiber cable structures in various configurations to create one or more electrical paths within optical fiber cable structures, while also eliminating many of the impediments created by conventional copper leads in optical fiber cable structures. For purposes of discussion herein, conductive carbon structures according to embodiments of the invention have a resistivity of at least 1.0 ohm-centimeters (0-cm), compared to at least $10^{11}$ ohm-centimeters for a conventional dielectric or insulating material.

For example, according to embodiments of the invention, conductive carbon structures are mixed with a base polymer used in optical fiber jacket and inner cable elements to create electrically conductive paths within the optical fiber cable. Also, conductive carbon structures and CCS technologies are integrated into conventional printing materials of optical fiber cables to create electrically conductive paths. Also, conductive carbon structures and CCS technologies are coated on internal and external elements of optical fiber cables to create electrically conductive paths. For purposes of discussion herein, conductive carbon structure mixtures according to embodiments of the invention have a weight percent (i.e., weight of solute in the solution) within the range from 0.05% to 10%.

FIG. 1 is a cross-sectional view of a hybrid or electro-optical cable 10, according to an embodiment of the invention. The cable 10 includes an optical fiber 12 having a core region and a cladding region formed around the core region. According to an embodiment of the invention, the cable 10 also includes a first electrically conductive carbon structure 14 formed around the optical fiber 12. The first electrically conductive carbon structure 14 can be a nano-carbon path, or any other suitable conductive carbon structure. The first electrically conductive carbon structure 14 can be formed around the optical fiber 12 in any suitable manner. For example, the first electrically conductive carbon structure 14 can be extruded around the optical fiber 12. Alternatively, the first electrically conductive carbon structure 14 can be applied as an exterior boundary layer or coating around the optical fiber 12.

The cable 10 also includes a coating layer 16, such as a polymer coating layer, formed around the first electrically conductive carbon structure 14. The cable 10 also includes a dielectric layer or barrier 18 formed around the coating layer 16. The dielectric layer or barrier 18 can be air or, alternatively, can be any suitable electrically insulating (dielectric) material, such as an additional polymer coating layer. Alternatively, the dielectric layer or barrier 18 can include or be filled with one or more dielectric materials, as well as include or be filled with one or more aramid or strength members. The cable 10 also includes an external polymer jacket 22 formed around the dielectric layer or barrier 18.

According to an embodiment of the invention, the cable 10 also includes a second electrically conductive carbon structure 24 formed within or on a portion of the external polymer jacket 22. The second electrically conductive carbon structure 24 can be a nano-carbon path, or any other suitable conductive carbon structure. The second electrically conductive carbon structure 24 can be formed within or a portion of the external polymer jacket 22. Alternatively, the second electrically conductive carbon structure 24 can be formed or coated on all or a portion of the inner or outer surface of the external polymer jacket 22. For example, the second electrically conductive carbon structure 24 can be applied as a co-extruded portion along with the external polymer jacket 22. Alternatively, the second electrically conductive carbon structure 24 can be applied as an exterior boundary layer on all or a portion of the inner or outer surface of the external polymer jacket 22.

According to an embodiment of the invention, the first electrically conductive carbon structure 14 and the second electrically conductive carbon structure 24 collectively form a positive/negative (+/−) electrically conductive path within the cable 10. The cable 10 also provides optical energy transmission via the optical fiber 12.

Figure 2:
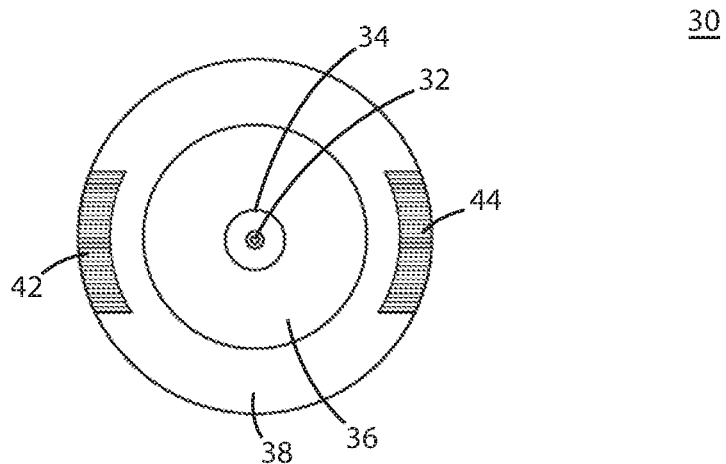
FIG. 2 is a cross-sectional view of a hybrid cable, according to another embodiment of the invention.

FIG. 2 is a cross-sectional view of a hybrid or electro-optical cable 30, according to another embodiment of the invention. The cable 30 includes an optical fiber 32 having a core region and a cladding region formed around the core region. The cable 30 also includes a coating layer 34, such as a polymer coating layer, formed around the optical fiber 32. The cable 30 also includes a dielectric layer or barrier 36 formed around the coating layer 34. The dielectric layer or barrier 36 can be air or, alternatively, can be any suitable electrically insulating (dielectric) material, such as an additional polymer coating layer. The cable 30 also includes an external polymer jacket 38 formed around the dielectric layer or barrier 36.

According to an embodiment of the invention, the cable 30 also includes a first electrically conductive carbon structure 42 formed within or on a portion of the external polymer jacket 38. The first electrically conductive carbon structure 42 can be a nano-carbon path, or any other suitable conductive carbon structure. The first electrically conductive carbon structure 42 can be formed within or on a portion of the external polymer jacket 38. Alternatively, the first electrically conductive carbon structure 42 can be formed or coated on all or a portion of the inner or outer surface of the external polymer jacket 38. For example, the first electrically conductive carbon structure 42 can be applied as a co-extruded portion along with the external polymer jacket 38. Alternatively, the first electrically conductive carbon structure 42 can be applied as an exterior boundary layer on all or a portion of the inner or outer surface of the external polymer jacket 38.

According to an embodiment of the invention, the cable 30 also includes a second electrically conductive carbon structure 44 formed within or on a portion of the external polymer jacket 38 and apart from the first electrically conductive carbon structure 42. The second electrically conductive carbon structure 44 can be a nano-carbon path, or any other suitable conductive carbon structure. The second electrically conductive carbon structure 44 can be formed within or on a portion of the external polymer jacket 38 and apart from the first electrically conductive carbon structure 42. Alternatively, the second electrically conductive carbon structure 44 can be formed or coated on all or a portion of the inner or outer surface of the external polymer jacket 38. For example, the second electrically conductive carbon structure 44 can be applied as a co-extruded portion along with the external polymer jacket 38 (and along with the first electrically conductive carbon structure 42). Alternatively, the second electrically conductive carbon structure 44 can be applied as an exterior boundary layer on all or a portion of the inner or outer surface the external polymer jacket 38 and apart from the first electrically conductive carbon structure 42.

According to an embodiment of the invention, the first electrically conductive carbon structure 42 and the second electrically conductive carbon structure 44 collectively form a positive/negative (+/−) electrically conductive path within the cable 30. The cable 10 also provides optical energy transmission via the optical fiber 32.

Figure 3:
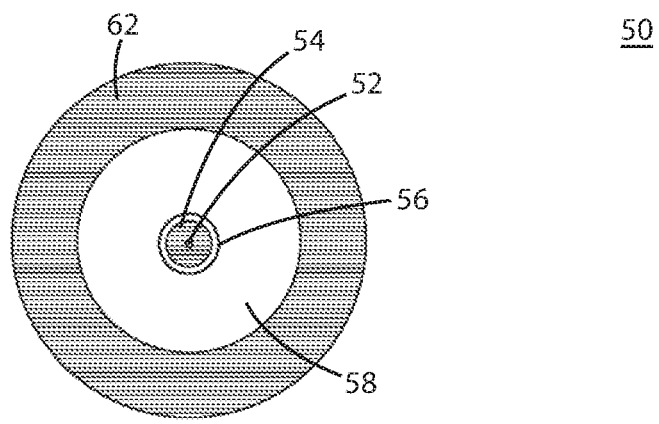
FIG. 3 is a cross-sectional view of a hybrid cable, according to yet another embodiment of the invention.

FIG. 3 is a cross-sectional view of a hybrid or electro-optical cable 50, according to yet another embodiment of the invention. The cable 50 includes an optical fiber 52 having a core region and a cladding region formed around the core region. According to an embodiment of the invention, the cable 50 also includes a first electrically conductive carbon structure 54 formed around the optical fiber 52. The first electrically conductive carbon structure 54 can be a nano-carbon path, or any other suitable conductive carbon structure. The first electrically conductive carbon structure 54 can be formed around the optical fiber 52 in any suitable manner. For example, the first electrically conductive carbon structure 54 can be extruded around the optical fiber 52. Alternatively, the first electrically conductive carbon structure 54 can be applied as an exterior boundary layer or coating around the optical fiber 52.

The cable 50 also includes a coating layer 56, such as a polymer coating layer, formed around the first electrically conductive carbon structure 54. The cable 50 also includes a dielectric layer or barrier 58 formed around the coating layer 56. The dielectric layer or barrier 58 can be air or, alternatively, can be any suitable electrically insulating (dielectric) material, such as an additional polymer coating layer. Alternatively, the dielectric layer or barrier 58 can include or be filled with one or more dielectric materials, as well as include or be filled with one or more aramid or strength members.

The cable 50 also includes an external jacket 62 extruded or otherwise formed around the dielectric layer 58, e.g., a polymer jacket or layer. According to an embodiment of the invention, the external jacket 62 includes a second electrically conductive carbon structure or material formed in or mixed with the material of the external jacket 62.

According to an embodiment of the invention, the first electrically conductive carbon structure 54 and the second electrically conductive carbon structure 62 collectively form a positive/negative (+/−) electrically conductive path within the cable 50. The cable 50 also provides optical energy transmission via the optical fiber 52.

Figure 4:
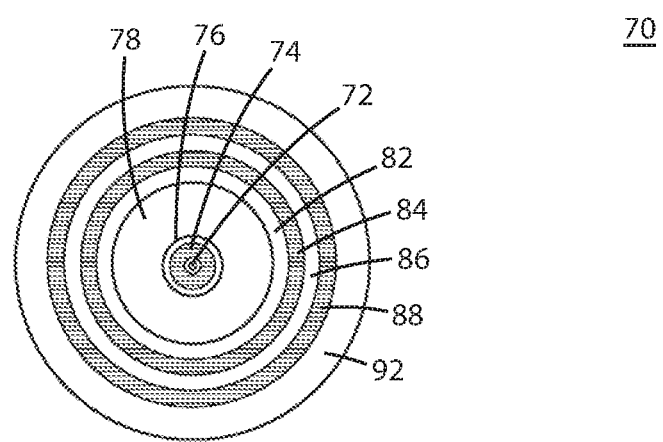
FIG. 4 is a cross-sectional view of a hybrid cable, according to still another embodiment of the invention.

FIG. 4 is a cross-sectional view of a hybrid or electro-optical cable 70, according to still another embodiment of the invention. The cable 70 includes an optical fiber 72 having a core region and a cladding region formed around the core region. According to an embodiment of the invention, the cable 70 also includes a first electrically conductive carbon structure 74 formed around the optical fiber 12. The first electrically conductive carbon structure 74 can be a nano-carbon path, or any other suitable conductive carbon structure. The first electrically conductive carbon structure 74 can be formed around the optical fiber 72 in any suitable manner. For example, the first electrically conductive carbon structure 74 can be extruded around the optical fiber 72. Alternatively, the first electrically conductive carbon structure 74 can be applied as an exterior boundary layer or coating around the optical fiber 72.

The cable 70 also includes a coating layer 76, such as a polymer coating layer, formed around the first electrically conductive carbon structure 74. The cable 70 also includes a dielectric layer or barrier 78 formed around the coating layer 16. The dielectric layer or barrier 78 can be air or, alternatively, can be any suitable electrically insulating (dielectric) material, such as an additional polymer coating layer. The cable 70 also includes a polymer jacket 82 formed around the dielectric layer or barrier 78.

According to an embodiment of the invention, the cable 70 also includes a second electrically conductive carbon structure layer or coating 84 formed around or within the polymer jacket 82. The second electrically conductive carbon structure layer or coating 84 can be a nano-carbon path, or any other suitable conductive carbon structure layer or coating. The second electrically conductive carbon structure layer or coating 84 can be formed around or within the polymer jacket 82 in any suitable manner. For example, the second electrically conductive carbon structure 84 can be a layer extruded around or within the polymer jacket 82. Alternatively, the second electrically conductive carbon structure layer 84 can be a coating applied as a boundary layer around or within the polymer jacket 82.

The cable 70 also can include another coating layer 86, such as a polymer coating layer, formed around the second electrically conductive carbon structure layer 74. According to an embodiment of the invention, the cable 70 also can include a third electrically conductive carbon structure layer or coating 88 formed around or within the coating layer 86. The third electrically conductive carbon structure layer or coating 88 can be a nano-carbon path, or any other suitable conductive carbon structure layer. The third electrically conductive carbon structure layer or coating 88 can be formed around or within the coating layer 86 in any suitable manner. For example, the third electrically conductive carbon structure 88 can be a layer extruded around or within the coating layer 86. Alternatively, the third electrically conductive carbon structure 88 can be a coating applied as a boundary layer around or within the coating layer 86. According to an embodiment of the invention, the third electrically conductive carbon structure layer or coating 88 provides an additional electrically conductive path within the cable 70. According to an embodiment of the invention, additional electrically conductive carbon structure layers or coatings provide additional electrically conductive paths within the cable 70.

The cable 70 also can include an external polymer jacket 92 formed around the third electrically conductive carbon structure layer 88.

According to an embodiment of the invention, the first electrically conductive carbon structure 74 and the second electrically conductive carbon structure layer 84 collectively form a positive/negative (+/−) electrically conductive path within the cable 70. Alternatively, the first electrically conductive carbon structure 74 and the third electrically conductive carbon structure layer 88 together form a positive/negative (+/−) electrically conductive path within the cable 70. Alternatively, the second electrically conductive carbon structure layer 84 and the third electrically conductive carbon structure layer 88 collectively form a positive/negative (+/−) electrically conductive path within the cable 70. The cable 70 also provides optical energy transmission via the optical fiber 72.

Figure 5:
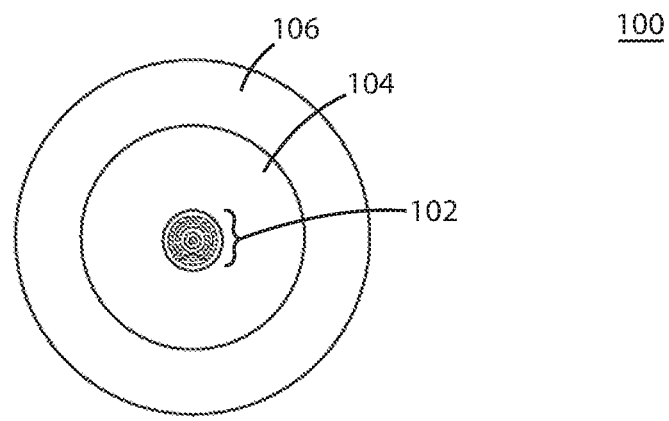
FIG. 5 is a cross-sectional view of a hybrid cable, according to yet another embodiment of the invention.

FIG. 5 is a cross-sectional view of a hybrid or electro-optical cable 100, according to yet another embodiment of the invention. The cable 100 includes an optical fiber 102 having a core region and a cladding region formed around the core region. The cable 100 also includes a dielectric layer or barrier 104 formed around the optical fiber 102. The cable 100 also includes an external polymer jacket 106 formed around the dielectric layer or barrier 104.

According to an embodiment of the invention, a pair of electrically conductive carbon structure layers or coatings are formed around the optical fiber 102, i.e., between the optical fiber 102 and the dielectric layer or barrier 104, as will be discussed in greater detail hereinbelow. According to an embodiment of the invention, the pair of electrically conductive carbon structure layers or coatings collectively form a positive/negative (+/−) electrically conductive path within the cable 100. The cable 100 also provides optical energy transmission via the optical fiber 102.

Figure 6A:
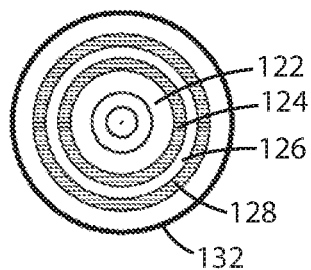
FIG. 6A is a cross-sectional view of a portion of the hybrid cable of FIG. 5, according to an embodiment of the invention.
Figure 6B:
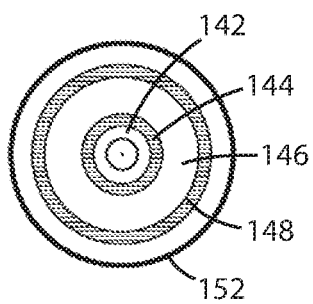
FIG. 6B is a cross-sectional view of a portion of the hybrid cable of FIG. 5, according to an another embodiment of the invention.

FIGS. 6A and 6B are cross-sectional views of the optical fiber 102 portion of the hybrid or electro-optical cable 100 shown in FIG. 5, according to an embodiment of the invention. As stated hereinabove, the optical fiber 102 portion of the hybrid or electro-optical cable 100 includes a pair of electrically conductive carbon structure layers or coatings formed around the optical fiber 102. According to an embodiment of the invention, the pair of electrically conductive carbon structure layers or coatings are formed around the optical fiber 102.

For example, as shown in FIG. 6A, if the optical fiber is coated with a polymer coating 122, then a first electrically conductive carbon structure layer or coating 124 is formed around the polymer coating 122, a polymer coating 126 is formed around the first electrically conductive carbon structure layer or coating 124, a second electrically conductive carbon structure layer or coating 128 is formed around the polymer coating 126, and a polymer coating 132 is formed around the second electrically conductive carbon structure layer or coating 128. In this manner, the alternating layers of layers of electrically conductive carbon structures and polymer coatings are applied directly at the fiber boundary, i.e., directly on the initial polymer coating 122 formed around the optical fiber.

Alternatively, as shown in FIG. 6B, if the optical fiber is not coated with a polymer coating, then the optical fiber has a dielectric layer or barrier 142 around the optical fiber, and a first electrically conductive carbon structure layer or coating 144 is formed directly around the dielectric layer or barrier 142. Also, a polymer coating 146 is formed around the first electrically conductive carbon structure layer or coating 144, a second electrically conductive carbon structure layer or coating 148 is formed around the polymer coating 146, and a polymer coating 152 is formed around the second electrically conductive carbon structure layer or coating 148. In this manner, the alternating layers of layers of electrically conductive carbon structures and polymer coatings are applied directly at the boundary of the dielectric layer or barrier 142 around the optical fiber.

In either configuration, according to embodiments of the invention, the first electrically conductive carbon structure layer or coating and the second electrically conductive carbon structure layer or coating collectively form a positive/negative (+/−) electrically conductive path within the cable 100. The cable 100 also provides optical energy transmission via the optical fiber 102.

According to embodiments of the invention, conductive carbon structures and CCS technologies also are integrated into multi-fiber optical fiber cable structures in various configurations to create one or more electrical paths within the multi-fiber optical fiber cable structures.

Figure 7:
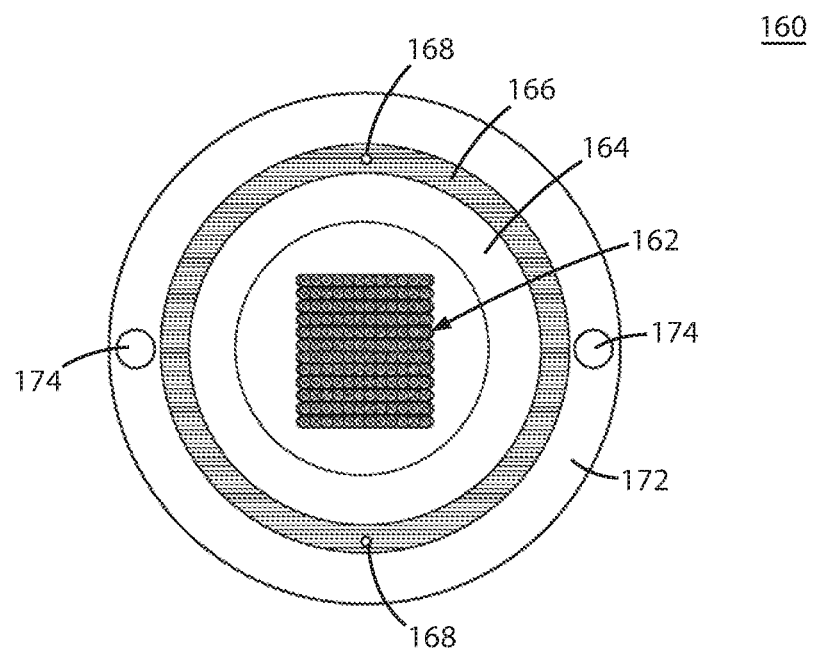
FIG. 7 is a cross-sectional view of a multi-fiber optical fiber hybrid cable, according to an embodiment of the invention.

For example, FIG. 7 is a cross-sectional view of a multi-fiber optical fiber hybrid cable 160, according to an embodiment of the invention. The multi-fiber optical fiber hybrid cable 160 includes a plurality of optical fibers 162, e.g., a plurality of stacked optical fiber ribbons, with each optical fiber ribbon including any suitable number of optical fibers. Alternatively, the plurality of optical fibers 162 can be a plurality of loose optical fibers.

The multi-fiber optical fiber hybrid cable 160 also includes one or more multi-fiber unit tubes or inner core tubes 164. Each multi-fiber unit tube 164 is dimensioned to receive therein any suitable number of a plurality of optical fibers.

The multi-fiber optical fiber hybrid cable 160 also can include one or more strength elements or layers 166 positioned around the multi-fiber unit tube 164. The strength element or layer 166 can be made of any suitable material. The strength element or layer 166 also can include one or more rip cords 168.

The multi-fiber optical fiber hybrid cable 160 also includes an outer jacket 172 formed around the strength element or layer 166 (or around the multi-fiber unit tube 164 if no strength element or layer 166 exists). The outer jacket 172 can be made of any suitable material, and the outer jacket 172 can be formed around the strength element or layer 166 (or around the multi-fiber unit tube 164 if no strength element or layer 166 exists). The outer jacket 172 also can include therein one or more structural rods 174.

According to embodiments of the invention, conductive carbon structures and CCS technologies are integrated into the multi-fiber optical fiber cable 160 in any suitable manner. For example, the optical fiber ribbon stack 162 can be coated with a first electrically conductive carbon structure and one or more of the inner core tube 164, the strength layer 166 and the outer jacket 172 can have formed therein or be coated with at least one second electrically conductive carbon structure. Alternatively, at least one first electrically conductive carbon structure and at least one second electrically conductive carbon structure both can be formed in or coated on one or more of the inner core tube 164, the strength layer 166 and the outer jacket 172.

According to embodiments of the invention, the first electrically conductive carbon structure layer or coating and the second electrically conductive carbon structure layer or coating collectively form a positive/negative (+/−) electrically conductive path within the cable 160. The cables 160 also provides optical energy transmission via the plurality of optical fibers 162.

Figure 8:
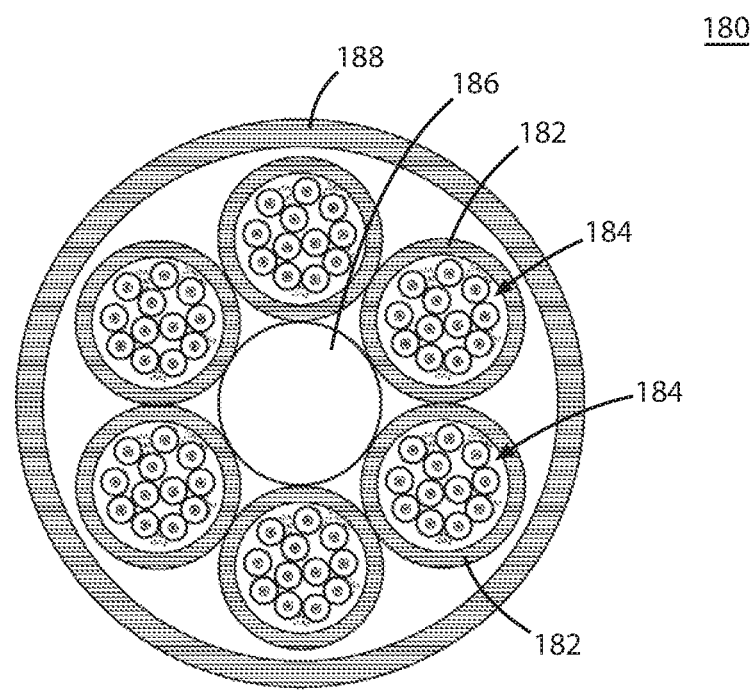
FIG. 8 is a cross-sectional view of a high count, multi-fiber optical fiber hybrid cable, according to an embodiment of the invention.

FIG. 8 is a cross-sectional view of a high count, multi-fiber optical fiber hybrid cable 180, according to an embodiment of the invention. The high count, multi-fiber optical fiber hybrid cable 180 includes a plurality of unit tubes or buffer tubes 182, with each unit or buffer tube 182 housing a plurality of optical fibers 184, e.g., a plurality of coated fibers (tight buffer), a plurality of loose optical fibers (as shown) or a plurality of stacked optical fiber ribbons. Each unit or buffer tube 182 can be made or any suitable material.

The high count, multi-fiber optical fiber hybrid cable 180 also can include a central strength member 186, around which the plurality of unit or buffer tubes 182 are positioned. The central strength member 186, which can be made of any suitable material, aids in the structure and organization of the high count, multi-fiber optical fiber hybrid cable 180.

The high count, multi-fiber optical fiber hybrid cable 180 also includes an outer jacket 188 formed around the plurality of unit or buffer tubes 182. The outer jacket 188 can be made of any suitable material, and the outer jacket 188 can be formed around the plurality of unit or buffer tubes 182.

According to embodiments of the invention, conductive carbon structures and CCS technologies are integrated into the high count, multi-fiber optical fiber hybrid cable 180 in any suitable manner. For example, at least one first electrically conductive carbon structure and at least one second first electrically conductive carbon structure can be formed within or coated on the inner or outer surface of various unit or buffer tubes 182, the central strength member 186 and/or the outer jacket 188, e.g., in any suitable arrangement or configuration.

For example, the central strength member 186 can include or be coated with the first electrically conductive carbon structure, and one or more unit or buffer tubes 182 and/or the outer jacket 188 can include or be coated with at least one second the electrically conductive carbon structure. Alternatively, one or more of the unit or buffer tubes 182 can include or be coated with the first electrically conductive carbon structure, and the central strength member 186 and/or the outer jacket 188 can include or be coated with the second electrically conductive carbon structure. Alternatively, the outer jacket 188 can include or be coated with the first electrically conductive carbon structure, and the central strength member 186 and/or one or more of the unit or buffer tubes 182 can include or be coated with the second electrically conductive carbon structure.

According to embodiments of the invention, the first electrically conductive carbon structure layer or coating and the second electrically conductive carbon structure layer or coating collectively form a positive/negative (+/−) electrically conductive path within the cable 180. The cable 180 also provides optical energy transmission via the plurality of optical fibers 184.

Figure 9:
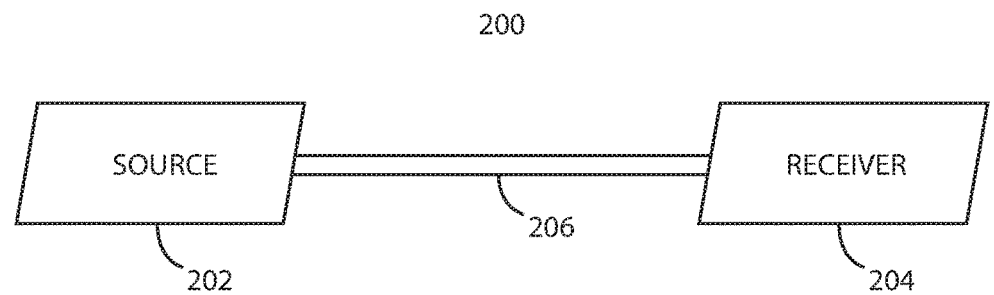
FIG. 9 is a simplified schematic diagram of an optical system in which hybrid cables according to embodiment of the invention are useful.

FIG. 9 is a simplified schematic diagram of an optical system 200 in which hybrid cables according to embodiment of the invention are useful. The system 200 includes one or more sources 202 for transmitting optical energy and electrical energy. It should be understood that the source 202 can be multiple sources for transmitting optical energy and/or for transmitting electrical energy. The system also includes one or more receivers 204 for receiving transmitted optical energy and electrical energy from the one or more sources 202. According to an embodiment of the invention, the system 200 also includes one or more hybrid cables 206 coupled between the source(s) 202 and the receiver(s) 204.

Figure 10:
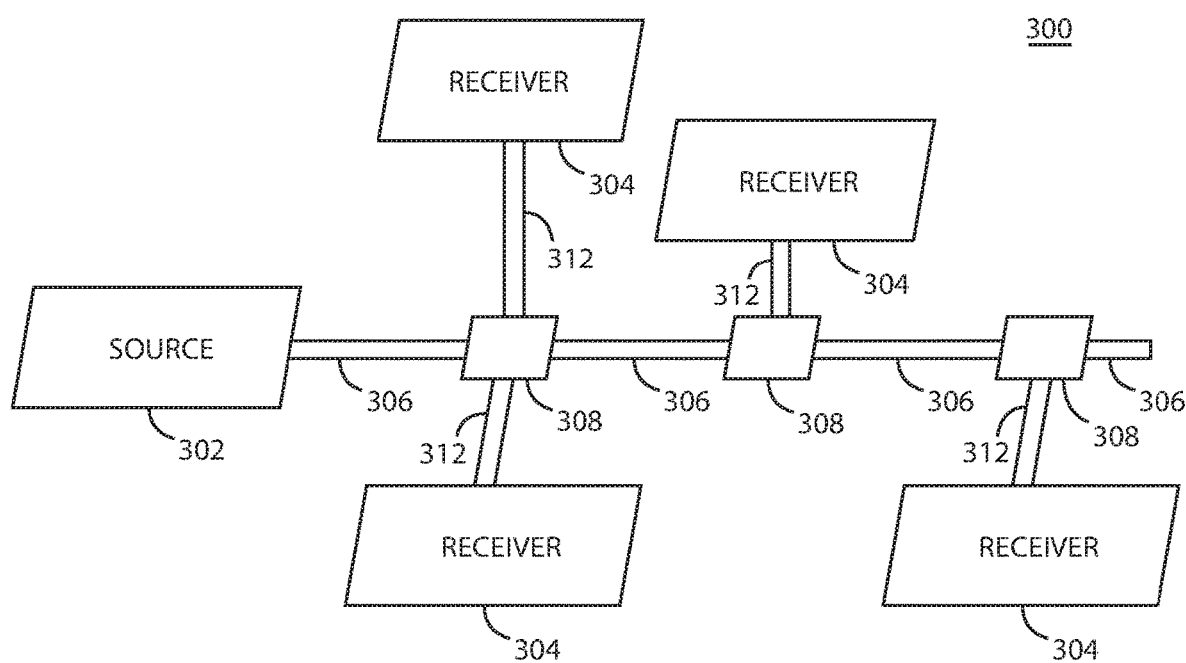
FIG. 10 is a simplified schematic diagram of another optical system in which hybrid cables according to embodiment of the invention are useful.

FIG. 10 is a simplified schematic diagram of another optical system 300 in which hybrid cables according to embodiment of the invention are useful. The system 300 includes one or more sources 302 for transmitting optical energy and electrical energy. It should be understood that the source 302 can be multiple sources for transmitting optical energy and/or for transmitting electrical energy. The system also includes one or more receivers 304 for receiving for receiving transmitted optical energy and electrical energy from the one or more sources 302. According to an embodiment of the invention, the system 300 also includes one or more hybrid cables 306 coupled between the source(s) 302 and the receiver(s) 304. The hybrid cable 306 includes a plurality of nodes 308, such as a plurality of wireless nodes, that couple the hybrid cable 306 to one or more receivers 304, e.g., via a suitable optical and/or electrical transmission medium 312.

It will be apparent to those skilled in the art that many changes and substitutions can be made to the embodiments of the invention herein described without departing from the spirit and scope of the invention as defined by the appended claims and their full scope of equivalents.

The invention claimed is:

1. A high bandwidth hybrid cable for connecting wireless communication elements, comprising:
    an optical fiber having a core region and a cladding region formed around the core region; and
    at least one coating region formed around the cladding region,
    wherein the at least one coating region includes:
        at least one first electrically conductive carbon structure,
        at least one second electrically conductive carbon structure, and
        an electrically insulating material coupled between the first electrically conductive carbon structure and the second electrically conductive carbon structure,
        wherein the resistivity of the first and second electrically conductive carbon structures is at least 1.0 ohm-centimeters and
        wherein the weight percent of the first and second electrically conductive carbon structures is within a range from 0.05% to 10%,
        wherein the entire portion of at least one of the first electrically conductive carbon structure and the second electrically conductive carbon structure is formed within an outermost portion of the coating region in such a way that the coating region does not completely surround the electrically conductive carbon structure and in such a way that an outer surface of the electrically conductive carbon structure tangentially extends from ends of an outer surface of the coating region,
    wherein the hybrid cable provides optical energy transmission via the optical fiber, and
    wherein the hybrid cable provides electrical energy transmission via the at least one first and second electrically conductive carbon structures.

2. The hybrid cable as recited in claim 1, wherein at least one of the first and second electrically conductive carbon structures comprises a nano-carbon path.

3. The hybrid cable as recited in claim 1, wherein at least one of the at least one first electrically conductive carbon structure and the at least one second electrically conductive carbon structure is coated on a portion of the at least one coating region.

4. The hybrid cable as recited in claim 1, wherein the at least one first electrically conductive carbon structure and the at least one second electrically conductive carbon structure are formed as layers within the at least one coating region.

5. A high bandwidth hybrid cable for connecting wireless communication elements, comprising:
    an optical fiber having a core region and a cladding region formed around the core region;
    at least one first electrically conductive carbon structure formed around the optical fiber;
    at least one coating region formed around the first electrically conductive carbon structure,
    wherein the at least one coating region includes:
        at least one second electrically conductive carbon structure, and
        an electrically insulating material coupled between the first electrically conductive carbon structure and the second electrically conductive carbon structure,
        wherein the resistivity of the first and second electrically conductive carbon structures is at least 1.0 ohm-centimeters and
        wherein the weight percent of the first and second electrically conductive carbon structures is within a range from 0.05% to 10%,
    wherein the entire portion of the second electrically conductive carbon structure is formed within an outermost portion of the coating region in such a way that the coating region does not completely surround the second electrically conductive carbon structure and in such a way that an outer surface of the second electrically conductive carbon structure tangentially extends from ends of an outer surface of the coating region,
    wherein the hybrid cable provides optical energy transmission via the optical fiber, and
    wherein the hybrid cable provides electrical energy transmission via the at least one first and second electrically conductive carbon structures.

6. The hybrid cable as recited in claim 5, wherein at least one of the first and second electrically conductive carbon structures comprises a nano-carbon path.

7. The hybrid cable as recited in claim 5, wherein the at least one second electrically conductive carbon structure is coated on a portion of the at least one coating region.

8. The hybrid cable as recited in claim 5, wherein the electrical insulator is formed as a layer around the at least one coating region, and wherein the at least one second electrically conductive carbon structure is formed as a layer around the electrical insulator.

9. The hybrid cable as recited in claim 8, wherein the at least one second electrically conductive carbon structure is mixed with a polymer coating, and wherein the polymer coating mixed with the at least one second electrically conductive carbon structure is formed as a layer around the electrical insulator.

10. The hybrid cable as recited in claim 5, wherein the at least one second electrically conductive carbon structure is formed as a layer within the at least one coating region.

11. A high bandwidth hybrid cable for connecting wireless communication elements, comprising:
a plurality of optical fibers, each of the optical fibers having a core region, a cladding region formed around the core region and at least one coating region formed around the cladding region,
at least one multi-fiber unit tube, wherein the at least one multi-fiber unit tube is dimensioned to receive the plurality of optical fibers;
a jacket surrounding the at least one multi-fiber unit tube;
at least one first electrically conductive carbon structure;
at least one second electrically conductive carbon structure; and
an electrically insulating material coupled between the first electrically conductive carbon structure and the second electrically conductive carbon structure,
wherein the resistivity of the first and second electrically conductive carbon structures is at least 1.0 ohm-centimeters and
wherein the weight percent of the first and second electrically conductive carbon structures is within a range from 0.05% to 10%,
wherein the entire portion of at least one of the first electrically conductive carbon structure and the second electrically conductive carbon structure is formed within an outermost portion of the coating region in such a way that the coating region does not completely surround the electrically conductive carbon structure and in such a way that an outer surface of the electrically conductive carbon structure tangentially extends from ends of an outer surface of the coating region,
wherein the hybrid cable provides optical energy transmission via the plurality of optical fibers, and
wherein the hybrid cable provides electrical energy transmission via the at least one first and second electrically conductive carbon structures.

12. The hybrid cable as recited in claim 11, wherein at least one of the first and second electrically conductive carbon structures comprises a nano-carbon path.

13. The hybrid cable as recited in claim 11, wherein at least one of the first and second electrically conductive carbon structures is coated on at least a portion of the at least one multi-fiber unit tube.

14. The hybrid cable as recited in claim 11, wherein the plurality of optical fibers comprises a plurality of optical fiber ribbons stacked within the at least one multi-fiber unit tube.

15. The hybrid cable as recited in claim 14, wherein at least one of the first and second electrically conductive carbon structures is coated around the stack of optical fiber ribbons.

16. The hybrid cable as recited in claim 11, further comprising at least one strength member, and wherein at least one of the first and second electrically conductive carbon structures is formed within at least a portion of the at least one strength member.

17. The hybrid cable as recited in claim 11, further comprising at least one strength member, and wherein at least one of the first and second electrically conductive carbon structures is coated on at least a portion of the at least one strength member.

18. A system for transmitting optical energy and electrical energy between wireless communication elements, comprising:
at least one source of optical energy and electrical energy;
a high bandwidth hybrid cable coupled to the at least one source for transmitting optical energy and electrical energy from the at least one source; and
at least one receiver coupled to the hybrid cable for receiving optical energy and electrical energy transmitted from the at least one source via the high bandwidth hybrid cable,
wherein the high bandwidth hybrid cable includes at least one length of optical fiber having
a core region
a cladding region formed around the core region, and
at least one coating region formed around the cladding region, wherein the at least one coating region includes:
at least one first electrically conductive carbon structure,
at least one second electrically conductive carbon structure, and
an electrically insulating material coupled between the first electrically conductive carbon structure and the second electrically conductive carbon structure,
wherein the resistivity of the first and second electrically conductive carbon structures is at least 1.0 ohm-centimeters and
wherein the weight percent of the first and second electrically conductive carbon structures is within a range from 0.05% to 10%,
wherein the entire portion of at least one of the first electrically conductive carbon structure and the second electrically conductive carbon structure is formed within an outermost portion of the coating region in such a way that the coating region does not completely surround the electrically conductive carbon structure and in such a way that an outer surface of the electrically conductive carbon structure tangentially extends from ends of an outer surface of the coating region,
wherein the hybrid cable provides optical energy transmission via the optical fiber, and
wherein the hybrid cable provides electrical energy transmission via the at least one first and second electrically conductive carbon structures.

19. The system as recited in claim 18, further comprising at least one node coupled to the hybrid cable, wherein the at least one node couples the at least one receiver to the hybrid cable.

* * * * *